(12) United States Patent
Lindgren

(10) Patent No.: US 8,089,419 B2
(45) Date of Patent: Jan. 3, 2012

(54) RE-CONFIGURABLE ANTENNA AND A METHOD FOR ACQUIRING A CONFIGURATION OF A RE-CONFIGURABLE ANTENNA

(75) Inventor: Ulf Lindgren, Västra Frölunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 522 days.

(21) Appl. No.: 12/306,822

(22) PCT Filed: Jun. 30, 2006

(86) PCT No.: PCT/SE2006/000801
§ 371 (c)(1),
(2), (4) Date: Mar. 13, 2009

(87) PCT Pub. No.: WO2008/002209
PCT Pub. Date: Jan. 3, 2008

(65) Prior Publication Data
US 2009/0309802 A1    Dec. 17, 2009

(51) Int. Cl.
*H01Q 21/00* (2006.01)
(52) U.S. Cl. .................................. 343/816; 343/853

(58) Field of Classification Search ............. 343/795, 343/801, 802, 813, 816, 817, 818, 823, 824, 343/833, 834, 844, 850, 853, 876, 893; 375/260, 375/267; 455/575.7
See application file for complete search history.

(56) References Cited

U.S. PATENT DOCUMENTS

| | | | | |
|---|---|---|---|---|
| 6,417,807 B1 * | 7/2002 | Hsu et al. | ............... | 343/700 MS |
| 6,469,677 B1 * | 10/2002 | Schaffner et al. | ............. | 343/876 |
| 7,130,580 B2 * | 10/2006 | Alexiou et al. | ................. | 455/39 |
| 7,372,912 B2 * | 5/2008 | Seo et al. | ....................... | 375/267 |
| 7,469,152 B2 * | 12/2008 | Cetiner et al. | ............. | 455/562.1 |
| 7,551,146 B2 * | 6/2009 | Pan et al. | ...................... | 343/876 |

\* cited by examiner

*Primary Examiner* — Michael C Wimer

(57) ABSTRACT

The present invention relates to a method for acquiring a configuration of a re-configurable antenna, having at least two different antenna element configurations, where the antenna's element mutual coupling characteristics are known in advance in the form of an antenna coupling matrix ($C_k(n)$), the acquired configuration having a desired effect on a transmission channel, the method comprising the steps: setting an initial configuration of the re-configurable antenna, resulting in an initial coupling matrix ($C_0$); estimating the transmission channel matrix ($\hat{H}(n)$), which transmission channel matrix ($\hat{H}(n)$) includes the effect of the antenna; calculating a generic transmission channel matrix ($\tilde{H}(n)$), which generic transmission channel matrix ($\tilde{H}(n)$) excludes the effect of the antenna; and extracting a coupling matrix (C) that provides a desired transmission channel matrix (H(n)), including the effect of the antenna.

14 Claims, 3 Drawing Sheets

RE-CONFIGURABLE ANTENNA AND A METHOD FOR ACQUIRING A CONFIGURATION OF A RE-CONFIGURABLE ANTENNA

TECHNICAL FIELD

The present invention relates to a method for acquiring a configuration of a re-configurable antenna, comprising at least two antenna elements, the antenna having at least two different antenna element configurations, each antenna element configuration having certain antenna element mutual coupling characteristics, which antenna element mutual coupling characteristics are known in advance in the form of an antenna coupling matrix for each possible antenna element configuration, the acquired configuration having a desired effect on a transmission channel.

The present invention also relates to a re-configurable antenna, comprising at least two antenna elements, the antenna having at least two different antenna element configurations, each antenna element configuration having certain antenna element mutual coupling characteristics, which antenna element mutual coupling characteristics are known in advance in the form of an antenna coupling matrix for each possible antenna element configuration, the acquired configuration having a desired effect on a transmission channel.

BACKGROUND

The demand for wireless communication systems has grown steadily, and is still growing, and a number of technological advancement steps have been taken during this growth. In order to acquire increased system capacity and user bit rate for wireless systems by employing uncorrelated propagation paths for data streams, MIMO (Multiple Input Multiple Output) systems have been considered to constitute a preferred technology for improving the capacity.

MIMO employs a number of separate independent signal paths for data streams, for example by means of several transmitting and receiving antennas. The more signal paths that are available, the more parallel data streams may be transmitted.

One problem with MIMO transmission is channel correlation and antenna coupling. These factors tend to limit the number of information streams that are possible to transmit or receive.

In the document "Reconfigurable antenna solution for MIMO-OFDM systems" by Daniele Piazza and Kapil R. Dandekar, a MIMO antenna system comprising re-configurable antennas is described. The re-configurable antennas are described as dipoles, which electrical lengths are altered by means of PIN diode switches. Thus the mutual coupling and far field radiation pattern are altered. These variable electrical characteristics allow multipath signal components to be weighted differently, and by setting the switches in a certain configuration and thus setting certain electrical characteristics, the MIMO link capacity may be enhanced.

A disadvantage of the configuration disclosed in said document is that the momentary optimal choice is determined by switching through all possible switch configurations available, and measuring the channel for each switch configuration. Each time the channel capacity decreases below a threshold, the procedure is repeated. This is a lengthy procedure that requires a lot of capacity, and which procedure, in fact, is quite impractical.

In MIMO transmission, the channel matrix has eigenvalues in the same order of magnitude. Hence in case the channel matrix has big eigenvalue spread, some of the information streams will be subject to high error rates and should therefore not be recovered. In a similar way as the channel matrix, the coupling between antenna elements defies MIMO transmission. The coupling and channel matrix can be seen as two independent matrixes. Thus, the product can be more MIMO destructive but also having an equalization effect which enhances MIMO transmission. Hence, observing the channel matrix given a certain antenna constellation results in a measure for how the antenna coupling should be adjusted. Assume that the MIMO antenna supports a means for adjusting the coupling then it can be set to produce a matrix product which is pro MIMO. The adjustment can be adaptive or by lookup.

SUMMARY OF THE INVENTION

The objective problem that is solved by the present invention is to provide a method and arrangement to easily find the best configuration for a re-configurable antenna, in view of the present transmission channel.

This objective problem is solved by means of a method according to the introduction. Said method comprises the following steps: setting an initial configuration of the re-configurable antenna, resulting in an initial coupling matrix; estimating the transmission channel matrix, which transmission channel matrix includes the effect of the antenna; calculating a generic transmission channel matrix, which generic transmission channel matrix excludes the effect of the antenna; and extracting a coupling matrix that provides a desired transmission channel matrix, including the effect of the antenna.

This objective problem is also solved by means of a re-configurable antenna according to the introduction. Said antenna is arranged for being re-configurated according to the following steps: an initial configuration of the re-configurable antenna is set, resulting in an initial coupling matrix; the transmission channel matrix is estimated, which transmission channel matrix includes the effect of the antenna; a generic transmission channel matrix is calculated, which generic transmission channel matrix excludes the effect of the antenna; a coupling matrix that provides a desired transmission channel matrix, including the effect of the antenna, is extracted, where the antenna is re-configured in such a way that its coupling matrix corresponds to the extracted coupling matrix.

According to a preferred embodiment, the generic transmission channel matrix is calculated by multiplying the inverted initial coupling matrix with the transmission channel matrix.

Other preferred embodiments are disclosed in the dependent claims.

Several advantages are achieved by means of the present invention, for example:
- providing the ability to adapt the antenna response depending on the observed channel;
- performing signal modifications prior to demodulation, or modulation, eliminating radio noise distortion; and
- providing a method that is practically feasible.

BRIEF DESCRIPTION OF DRAWINGS

The present invention will now be described more in detail with reference to the appended drawings, where.

DETAILED DESCRIPTION

Figure 1:
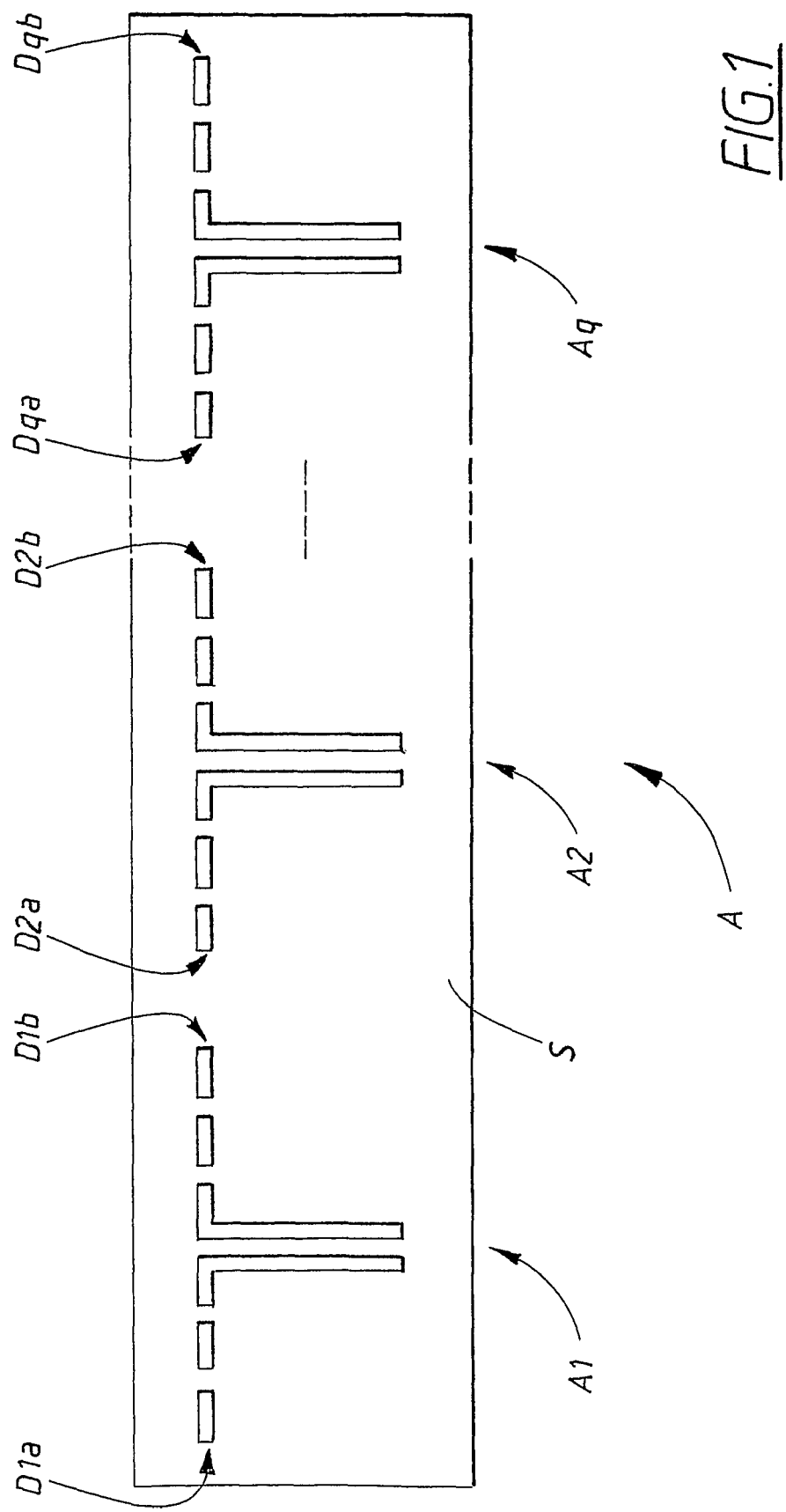
FIG. 1 shows a set of re-configurable dipole antennas.

In a MIMO system, the key concept is to transmit and receive several streams of data at once. This can be seen as messages stacked in a vector x(n), where n denotes time. These messages are transmitted in a time varying channel, described by a channel matrix H(n), where n is a time index. The received messages are stacked in a vector $$y(n)=H(n)x(n) \tag{1}$$

From matrix theory, any matrix can be represented by SVD (Singular Value Decomposition). That is, the channel matrix H(n) can be written as a product of three fundamental matrixes according to equation (2) below:

$$H(n)=U(n)D(n)V^H(n). \tag{2}$$

In the sequel, the time index n is often dropped to shorten notation, however, when used with functions or matrices it stresses the existence of a time dependence. In equation (2), D is a diagonal matrix and the values of the elements are non-negative and real, and also known as the singular values of the matrix H. U is a first unitary matrix and V is a second unitary matrix.

The general superscript $^H$ means that a matrix is transposed and complex conjugated. The matrices U and V being unitary means that $VV^H=UU^H=I$, where I is an identity matrix. Furthermore, the columns of V are eigenvectors to $H^HH$, and the columns of U are eigenvectors to $HH^H$.

A metric for a matrix is the quotient of the largest vs. the smallest eigenvalue magnitude, and it is known as the condition number c. In case the condition number c is high, the eigenvalue spread is large. The matrix is then singular or ill conditioned.

The eigenvalues of H are associated with the eigenvectors of the matrixes U and V. The rank of a matrix is equal to the number of nonzero eigenvalues. In case there are one or more eigenvalues equal to zero, the matrix H is rank deficient.

The MIMO concept relies on that the channel matrix has a rank which equals or exceeds the number of streams to be transmitted. The data streams are transmitted over a number of antennas. The number of antennas must equal or exceed the number of streams to be transmitted. The antennas have radiation lobes which are related to the eigenvectors of the channel matrix, and the magnitude of the eigenvalues indicates the channel attenuation of the antenna lobes.

The capacity, or the number of streams, of a MIMO system depends as stated on the rank r of the channel matrix. If the channel matrix contains the antenna system, the computation of a channel covariance matrix provides information regarding how well a MIMO system can be implemented. In case the cross-correlation of signals is high, the condition number c of the channel matrix is high. This means that some eigenvectors have a large attenuation, and it is not reliable to transmit a data stream using the corresponding vector as array weights in the beam former.

More in detail, in an explanatory example, D is a 3×3-matrix and has the following appearance:

$$D = \begin{pmatrix} d_{11} & 0 & 0 \\ 0 & d_{22} & 0 \\ 0 & 0 & d_{33} \end{pmatrix}$$

Then the diagonal values $d_{11}$, $d_{22}$, $d_{33}$ are the singular values of H, and are also the magnitude of the eigenvalues of H. It is not uncommon that the eigenvalues are complex, and in this context it is more useful to use the magnitude of the eigenvalues, since these in this case are measures of the channel quality. Each data stream is here associated with a certain antenna radiation lobe. If the antenna radiation lobe associated with the eigenvalue magnitude $d_{33}$, is attenuated by, for example, an obstacle, that eigenvalue magnitude has a small number.

The antenna system is contributing to the channel matrix, and the primary contribution to the channel is coupling between antenna elements. In the following, the time variable n will temporarily be inserted again, since new matrixes are defined. The coupling can be represented as a coupling matrix $$C = \begin{bmatrix} c_{11} & \cdots & c_{1N} \\ \vdots & \ddots & \vdots \\ c_{N1} & \cdots & c_{NN} \end{bmatrix}. \tag{3}$$

A matrix $\tilde{H}(n)$ denotes a generic channel matrix, for a channel not comprising the antenna system, but only the channel itself. The observable channel H(n), includes coupling. Mathematically that is expressed as:

$$H(n)=C\tilde{H}(n). \tag{4}$$

Here, H(n) may be estimated by means of channel measurements. From (1) we know that y(n)=H(n)x(n), and therefore the total system may be described as:

$$y(n)=C\tilde{H}(n)x(n). \tag{5}$$

According to the present invention, the generic channel matrix $\tilde{H}(n)$ without an antenna is modelled. The antenna is known a priori, hence it is known. Starting from one observation of the channel and any antenna configuration, it is possible to find the best antenna configuration available.

In a first embodiment example, the channel matrix $\tilde{H}(n)$ and the coupling matrix C share a common unitary basis matrix S(n), instead of the more general U and V matrixes mentioned before. Using S(n), the following equations are formed:

$$\tilde{H}(n)=S(n)D_{\tilde{H}}(n)S^H(n) \tag{6}$$

$$C(n)=S(n)D_C(n)S^H(n). \tag{7}$$

Equation (2) is now rewritten using S as a common basis:

$$H=SDS^H. \tag{8}$$

In equation (6) and (7), $D_{\tilde{H}}$ and $D_C$ are diagonal matrixes containing the eigenvalues related to coupling and channel. Their multiplication results in the eigenvalues of the joint antenna channel matrix, that is:

$$H=SD_{\tilde{H}}S^H SD_C S^H=SD_{\tilde{H}D_C}S^H. \tag{9}$$

As evident from equation (8) and (9), the product of $D_{\tilde{H}}$ and $D_C$ forms the eigenvalues of the joint antenna channel matrix D. This implies that the coupling can be used to compensate the eigenvalues in the channel. In other words, the matrix $D_C$ may be altered by altering C, while the matrix $D_{\tilde{H}}$ is fixed. But if $D_C$ is altered, then the joint antenna channel matrix D is altered. If D is altered, the data stream transfer is affected, obstacles may for example be compensated for. In other words, the mutual coupling between antenna elements in the antenna system used can be used for achieving the best possible MIMO transmission.

It is thus desirable to have an antenna configuration for which the mutual coupling is variable, i.e. it is desirable to be able to change the coupling matrix C. One preferred way to vary the mutual coupling is to introduce parasitic elements, where the parasitic elements will alter the impedance of the antenna system and therefore the mutual coupling will change also.

According to a preferred embodiment, as shown in FIG. 1, a reconfigurable antenna A which comprises a number q of dipole antenna elements A1, A2 ... Aq is arranged for MIMO communication. The dipole antennas A1, A2 ... Aq are in this example etched on a dielectric copper-clad substrate S. Each dipole antenna A1, A2 ... Aq has two dipole arms D1a, D1b; D2a, D2b ... Dqa, Dqb.

Figure 2:
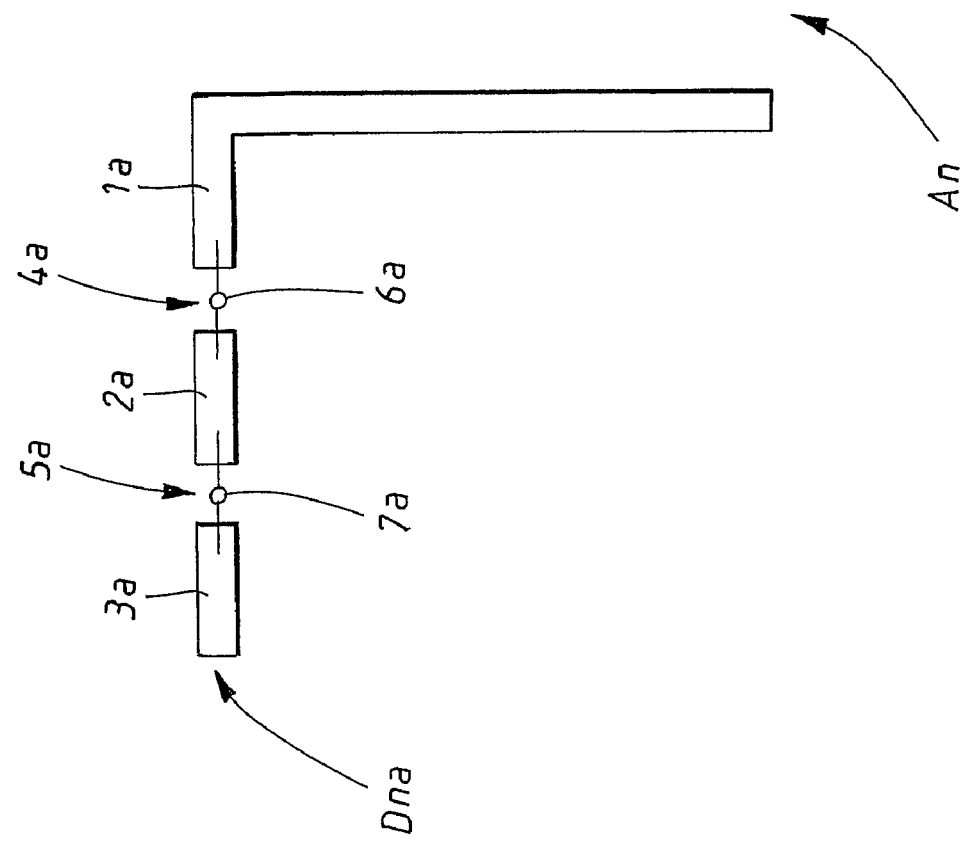
FIG. 2 shows a re-configurable dipole antenna.

In FIG. 2, one such dipole antenna element An is shown. Each dipole arm Dna, Dnb is divided into three parts 1a, 2a, 3a; 1b, 2b, 3b, where the respective first part 1a, 1b always is connected to the rest of the dipole antenna An. The two other respective parts 2a, 3a; 2b, 3b are discrete, where gaps 4a, 5a; 4b, 5b are formed between themselves and/or the respective first part 1a, 1b.

Over each gap 4a, 5a; 4b, 5b, a PIN diode 6a, 7a; 6b, 7b is connected, where each PIN diode 6a, 7a; 6b, 7b is externally controlled, and may connect or disconnect the two parts between which it is connected. In this manner, with reference also to FIG. 1, each dipole antenna A1, A2 ... Aq has four parasitic elements 2a, 3a; 2b, 3b in form of the second and third part of each dipole arm Dna, Dnb. The four parasitic elements 2a, 3a; 2b, 3b may be connected and disconnected in such a way that, for each dipole antenna A1, A2 ... Aq, 16 different antenna configurations are available per antenna element. The total number M of antenna configurations is in this case $16^q$. Generally, the number of antenna configurations available per antenna element is p and then the total number M of antenna configurations is written as $M=p^q$. Then, the antenna coupling matrixes available may be written as $C_k$, where k=1 ... M.

By characterizing the antenna configuration, i.e. by measuring the possible parasitic variations, the coupling matrix C is known. The known coupling matrix C is used to select the most favourable antenna constellation given a certain channel estimate. That is, for a measured estimate $\hat{H}$ of the real channel H, the following expression is valid:

$$\hat{H} = C_0 \hat{\hat{H}}. \tag{10}$$

Here, $C_0$ is a start value for the known mutual coupling matrix, $\hat{H}$ is an estimated channel matrix comprising the antenna system, and $\hat{\hat{H}}$ is an estimated channel matrix not comprising the antenna system. Since $\hat{H} = C_0 \hat{\hat{H}}$, then:

$$\hat{\hat{H}} = (C_0)^{-1} \hat{H}. \tag{11}$$

In the following, it is shown how the best mutual coupling is determined. In the antenna system according to the example, there are M possible antenna configurations available. Using the coupling matrix, which is known in advance, and the measured estimated channel, not comprising the antenna system, the following calculation is stepped through in a first embodiment example:

$$\underset{k=0...M}{\mathrm{argmin}} Q(C_k) = \left( tr\left\{ \left(I - C_k \hat{\hat{H}}\right)^H \left(I - C_k \hat{\hat{H}}\right) \right\} \right). \tag{12}$$

Here, $Q(C_k)$ is a discrete cost function and "tr" means the function "trace", which is the sum of the diagonal, being the sum of the eigenvalues. The expression $I - C_k \hat{\hat{H}}$ is squared in order to obtain positive values, enabling a enabling a minimization of the (squared) magnitude error. The result from equation (11) is used in equation (12), since the generic channel estimate $\hat{\hat{H}}$ and the coupling $C_k$ are multiplied in equation (12).

If the cost function $Q(C_k)$ in equation (12) is minimized, it means that $C_k \hat{\hat{H}} \approx I$, and thus that $C_k \approx [\hat{\hat{H}}]^{-1}$. There will probably not be an exact match between $C_k$ and $[\hat{\hat{H}}]^{-1}$ due to the fact that there are infinitely many channel realization whereas in most practical cases $C_k$ belong to a finite set. However, there is a best fit to the channel using $C_k$ as indicated above. Then, the estimated channel matrix $\hat{H}$ comprising the antenna system is diagonalized and, in this case, equalized, since the formulation in equation (12) sets out to form an estimated channel matrix $\hat{H}$ comprising the antenna system which equals the identity matrix 1.

The antenna is re-configured using the coupling, minimizing equation (12). The channel is time-dependent, which implies that it varies over time, why equations (10)-(12) will have to be re-iterated. In this context the initial coupling $C_0$ is the presently chosen antenna configuration, i.e. the mutual coupling matrix that minimized equation (12) last time.

In this example, the search for the best $C_k$ is discrete, and is preferably carried out by means of a table look up approach.

If the coupling adjustment is successful, i.e. the variability of C is sufficient, the eigenvalues of the joint channel and antenna system H are compressed. This means that the sensitivity of the radio could be increased, since the eigenvalue spread of the system is reduced. In addition, it should be noted that the eigenvalue spread change occurs prior the demodulation. Hence, the signals of certain streams may be pushed above the amplifier noise floor. A consequence of this is that an additional stream can be used for MIMO. Moreover, it is also possible to trade bit error vs the number of streams.

To construct an example: assume that four by four MIMO scheme is used where only two streams have acceptable power (eigenvalues). Adjusting the mutual coupling results in a reduction of the largest eigenvalues but also an increase of the two smallest, compression. The receiver can now increase the amplification, and use for example three streams. These three streams will have higher bit errors but it is also an 50% increase of data. This is a trade off between streams and bit error.

In a second preferred embodiment, the identity matrix I in equation (13) is exchanged for a more general channel performance matrix W(n). The estimated channel matrix $\hat{H}$ comprising the antenna system has the eigenvalue magnitudes $$D = \begin{pmatrix} d_{11} & 0 & 0 \\ 0 & d_{22} & 0 \\ 0 & 0 & d_{33} \end{pmatrix}, \tag{13}$$

where $d_{11}$ is very small, $d_{22}$ is relatively small and $d_{33}$ is large. This means that the antenna radiation lobe associated with the eigenvalue magnitude $d_{11}$ not is attenuated, that the antenna radiation lobe associated with the eigenvalue magnitude $d_{22}$ is slightly attenuated and that the antenna radiation lobe associated with the eigenvalue magnitude $d_{33}$ is very attenuated.

Then the matrix W has the following values:

$$W = \begin{pmatrix} w_{11} & 0 & 0 \\ 0 & w_{22} & 0 \\ 0 & 0 & w_{33} \end{pmatrix}, \quad (14)$$

where $w_{11}$ is of average value, $w_{22}$ is large and $w_{33}$ is zero. Then $d_{11}$ and $d_{22}$ are equalized, while the "bad" $d_{33}$ is minimized. Then, when regarding the antenna radiation lobes, the antenna radiation lobe corresponding to $d_{33}$ is suppressed, while the antenna radiation lobe corresponding to $d_{11}$ and $d_{22}$ are formed in such manner that they form two essentially equally good MIMO channels. The forming of the antenna radiation lobes is performed by affecting the antenna mutual coupling in the way described with reference to FIG. 1. The coupling is calculated using W instead of I in equation (13). In the special case according to the first embodiment, W=I.

As a conclusion, the present invention provides a method that compensates a channel (including an antenna system) prior to any signal modification, such as modulation. According to the method, the eigenvalue spread should be reduced, or re-configured in a favourable way.

It is therefore possible to construct a receiver that can employ gain control in order to achieve good demodulation without risk for analogue distortion. That is, the method can be viewed as a compressor for the communication signal. In addition the terminal may be able to exploit more streams in the MIMO channel.

Figure 3:
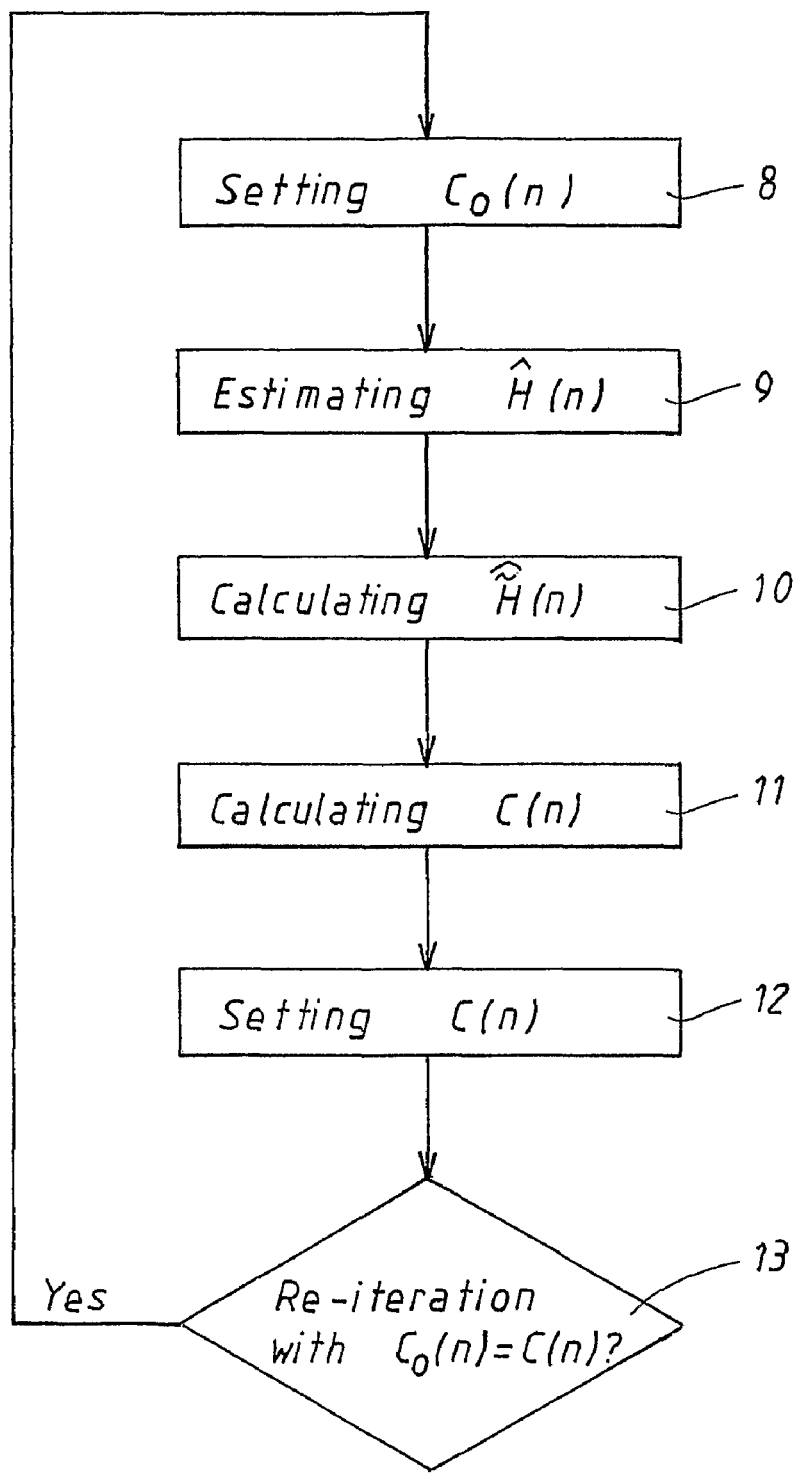
FIG. 3 shows a flow chart for the method according to the present invention.

In general, with reference to FIG. 3, the present invention provides a method for acquiring a configuration of a re-configurable antenna, comprising at least two antenna elements, the antenna having at least two different antenna element configurations, each antenna element configuration having certain antenna element mutual coupling characteristics, which antenna element mutual coupling characteristics are known in advance in the form of an antenna coupling matrix $C_k(n)$ for each possible antenna element configuration, the acquired configuration having a desired effect on a transmission channel, the method comprising the steps, with reference to FIG. 3:

setting 8 an initial configuration of the re-configurable antenna, resulting in an initial coupling matrix $C_0(n)$;

estimating 9 the transmission channel matrix $\hat{H}(n)$, which transmission channel matrix $\hat{H}(n)$ includes the effect of the antenna;

calculating 10 a generic transmission channel matrix $\hat{\hat{H}}(n)$, which generic transmission channel matrix $\hat{\hat{H}}(n)$ excludes the effect of the antenna; and extracting 11 a coupling matrix C that provides a desired transmission channel matrix H(n), including the effect of the antenna.

The re-configurable antenna is then set 12 with the calculated coupling matrix C which preferably is one of the antenna coupling matrixes $C_k(n)$ available. When necessary, the method is re-iterated 13, with the calculated coupling matrix C as initial value $C_0$.

The present invention is not limited to the examples described above, but may vary freely within the scope of the appended claims. For example, if the coupling matrix is parameterized by a continuous vector function Q(x), where a differentiation of the vector function Q(x) with respect to a parameter vector x results in a gradient g(x), equation (12) will become $$\arg\min Q(x) = tr\{(I-CH(x))^H (I-CH(x))\} \quad (15)$$

which is continuous in x. The expression can be differentiated with respect to the vector and a gradient, g(x), can be computed. Updates in the parameter vector x are computed by means of an iterative search using the gradient g(x) according to:

$$x_p = x_{p-1} \mu g(x_{p-1}), \quad (16)$$

where μ is a step size parameter, and p is the iteration number. The iterative search may of course be performed in many other known ways, for example a so-called modified Newton search.

The antenna type and configuration described, is only an easily understood example. The present invention is of course applicable to all types of group antennas comprising at least two antenna elements, where each antenna element is re-configurable in such a way that the mutual coupling between the antenna elements in the group antenna is affected. Any type of parasitic may be used that accomplishes the desired effect.

It is also conceivable that a more or less continuous change of the antenna element mutual coupling characteristics is performed. Such a change would for example be realized by means of movable dielectric parts.

The use of the common unitary basis matrix S(n), instead of the more general U and V matrixes is due to the fact that it provides an more comprehensible explanation of the invention. Of course, the more general U and V matrixes may be used instead, but that will result in a slightly more complicated expression, where the matrixes are rotated, which is understood by the skilled person.

The invention claimed is:

1. A method for acquiring a configuration of a re-configurable antenna, comprising at least two antenna elements, the antenna having at least two different antenna element configurations, each antenna element configuration having certain antenna element mutual coupling characteristics, which antenna element mutual coupling characteristics are known in advance in the form of an antenna coupling matrix ($C_k(n)$) for each possible antenna element configuration, the acquired configuration having a desired effect on a transmission channel, the method comprising the steps:

setting an initial configuration of the re-configurable antenna, resulting in an initial coupling matrix ($C_0$);

estimating the transmission channel matrix ($\hat{H}(n)$), which transmission channel matrix ($\hat{H}(n)$) includes the effect of the antenna;

calculating a generic transmission channel matrix ($\hat{\hat{H}}(n)$), which generic transmission channel matrix ($\hat{\hat{H}}(n)$) excludes the effect of the antenna; and extracting a coupling matrix (C) that provides a desired transmission channel matrix (H(n)), including the effect of the antenna.

2. A method according to claim 1, wherein the antenna is re-configured in such a way that its coupling corresponds to the extracted coupling matrix (C).

3. A method according to claim 1, wherein the generic transmission channel matrix ($\hat{\hat{H}}(n)$) is calculated by multiplying the inverted initial coupling matrix ($[C_0(n)]^{-1}$) with the transmission channel matrix ($\hat{H}(n)$).

4. A method according to claim 1, wherein the extraction of a coupling matrix (C) that provides a desired transmission channel matrix (H(n)) is performed by means of minimizing a difference between a product of a coupling matrix ($C_k$) and the generic transmission channel matrix ($\hat{\hat{H}}(n)$), and a desired channel performance matrix (W(n)), where the minimizing is performed by altering the coupling matrix ($C_k$), and where (C) is the value of the coupling matrix ($C_k$) that minimizes said difference.

5. A method according to claim 4, wherein the desired channel performance matrix (W(n)) is the identity matrix (I).

6. A method according to claim 4 wherein the coupling matrix is parameterized by a continuous vector function (Q(x)), where a differentiation of the vector function (Q(x)) with respect to a parameter vector (x) results in a gradient (g(x)), and updates in the parameter vector (x) are computed by means of an iterative search using the gradient (g(x)).

7. A method according to claim 1 wherein the method is re-iterated, with the calculated coupling matrix (C) as initial coupling matrix ($C_0$).

8. A re-configurable antenna, comprising at least two antenna elements, the antenna having at least two different antenna element configurations, each antenna element configuration having certain antenna element mutual coupling characteristics, which antenna element mutual coupling characteristics are known in advance in the form of a coupling matrix ($C_k(n)$) for each possible antenna element configuration, the acquired configuration having a desired effect on a transmission channel wherein the antenna is arranged for being re-configured according to the following steps:
- an initial configuration of the re-configurable antenna is set, resulting in an initial coupling matrix ($C_0(n)$);
- the transmission channel matrix ($\hat{H}(n)$) is estimated, which transmission channel matrix ($\hat{H}(n)$) includes the effect of the antenna;
- a generic transmission channel matrix ($\tilde{H}(n)$) is calculated, which generic transmission channel matrix ($\tilde{H}(n)$) excludes the effect of the antenna;
- a coupling matrix (C) that provides a desired transmission channel matrix (H(n)), including the effect of the antenna, is extracted, where the antenna (A) is re-configured in such a way that its coupling corresponds to said extracted coupling matrix (C).

9. A re-configurable antenna according to claim 8, wherein the generic transmission channel matrix ($\tilde{H}(n)$) is calculated by multiplying the inverted initial coupling matrix ($[C_0(n)]^{-1}$) with the transmission channel matrix ($\hat{H}(n)$).

10. A re-configurable antenna according to claim 8, wherein the extraction of a coupling matrix (C) that provides a desired transmission channel matrix (H(n)) is performed by means of minimizing a difference between a product of a coupling matrix ($C_k$) and the generic transmission channel matrix ($\tilde{H}(n)$), and a desired channel performance matrix (W(n)), where the minimizing is performed by altering the coupling matrix ($C_k$), and where (C) is the value of the coupling matrix ($C_k$) that minimizes said difference.

11. A re-configurable antenna according to claim 10, wherein the desired channel performance matrix (W(n)) is the identity matrix (I).

12. A re-configurable antenna according to claim 10, wherein the coupling matrix is parameterized by a continuous vector function (Q(x)), where a differentiation of the vector function (Q(x)) with respect to a parameter vector (x) results in a gradient (g(x)), and updates in the parameter vector (x) are computed by means of an iterative search using the gradient (g(x)).

13. A re-configurable antenna according to claim 8, wherein each antenna element is in the form of a dipole antenna element comprising parasitic elements which are connected to, or disconnected from, said dipole antenna element by means of connective means.

14. A re-configurable antenna according to claim 13, wherein the connective means are in the form of PIN diode elements.

* * * * *

UNITED STATES PATENT AND TRADEMARK OFFICE
CERTIFICATE OF CORRECTION

PATENT NO. : 8,089,419 B2  
APPLICATION NO. : 12/306822  
DATED : January 3, 2012  
INVENTOR(S) : Lindgren Page 1 of 1

It is certified that error appears in the above-identified patent and that said Letters Patent is hereby corrected as shown below:

In the specifications:

In Column 4, Line 56, in Equation (9), delete "$SD_{\hat{H}D_C}S^H.$" and insert -- $SD_{\hat{H}}D_C S^H.$ --, therefor.

In Column 5, Line 63, in Equation (12), delete "$=\left(tr\left\{\left(I-C_k\hat{H}\right)^H\right.\right.$" and insert -- $=tr\left\{\left(I-C_k\hat{H}\right)^H\right.$ --, therefor.

In Column 5, Line 66, delete "Q($_k$)" and insert -- Q(C$_k$) --, therefor.

In Column 6, Line 20, delete "1." and insert -- I. --, therefor.

Signed and Sealed this  
Seventeenth Day of April, 2012

David J. Kappos  
*Director of the United States Patent and Trademark Office*